United States Patent
Li et al.

(10) Patent No.: US 11,184,081 B2
(45) Date of Patent: Nov. 23, 2021

(54) MULTI-USER MIMO PREFERENCE-INDICATION SIGNALING

(71) Applicant: Apple Inc., Cupertino, CA (US)

(72) Inventors: Guoqing Li, Cupertino, CA (US); Ping Wang, San Jose, CA (US); Rajneesh Kumar, Los Gatos, CA (US); Veerendra Boodannavar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 16/161,470

(22) Filed: Oct. 16, 2018

(65) Prior Publication Data
US 2019/0273553 A1 Sep. 5, 2019

Related U.S. Application Data

(60) Provisional application No. 62/638,334, filed on Mar. 5, 2018.

(51) Int. Cl.
*H04B 7/08* (2006.01)
*H04B 17/318* (2015.01)
(Continued)

(52) U.S. Cl.
CPC ........... *H04B 7/088* (2013.01); *H04B 7/0452* (2013.01); *H04B 17/318* (2015.01);
(Continued)

(58) Field of Classification Search
CPC . H04W 72/04; H04W 72/042; H04W 72/085; H04W 72/0446; H04W 72/0453;
(Continued)

(56) References Cited

U.S. PATENT DOCUMENTS 9,055,561 B2  6/2015 Prasad
2010/0166010 A1* 7/2010 Ukita ................... H04L 1/0009
370/465
(Continued)

FOREIGN PATENT DOCUMENTS

CN         106209184 A    12/2016
CN         107211448 A     9/2017
(Continued)

OTHER PUBLICATIONS

The 802.11 Working Group of the LAN/MAN Standards Committee of the IEEE Computer Society; "P802.11ayTM/D1.1. Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in n license-exempt bands above 45 GHz"; Feb. 27, 2018; pp. 80-81; XP068137607.

(Continued)

*Primary Examiner* — Peter Chen
(74) *Attorney, Agent, or Firm* — Kowert, Hood, Munyon, Rankin & Goetzel, P.C.

(57) ABSTRACT

An interface circuit in a recipient electronic device (such as a cellular telephone) may provide preference-indication information for an electronic device (such as an access point). Notably, the recipient electronic device may compute preference-indication information associated with the recipient electronic device, where the preference-indication information indicates whether the recipient electronic device prefers that the electronic device use downlink (DL) multi-user (MU) MIMO transmissions when communicating with the recipient electronic device. Then, the recipient electronic device may provide the preference-indication information in a packet or a frame associated with the electronic device. In some embodiments, the recipient electronic device deter- (Continued)

mines a trigger event (such as measuring a motion indication), and the computing may be selectively performed based at least in part on the trigger event. Moreover, the preference-indication information may include additional information that was used by the recipient electronic device to compute the preference indication of the recipient electronic device.

20 Claims, 5 Drawing Sheets

(51) Int. Cl.
  *H04B 7/0452* (2017.01)
  *H04W 72/04* (2009.01)
  *H04W 72/08* (2009.01)
  *H04W 24/10* (2009.01)

(52) U.S. Cl.
  CPC ....... *H04W 72/042* (2013.01); *H04W 72/085* (2013.01); *H04W 24/10* (2013.01)

(58) Field of Classification Search
  CPC ......... H04W 72/0413; H04W 72/1289; H04W 72/1284; H04W 24/10; H04W 84/12; H04W 88/08; H04W 72/08; H04W 74/006; H04W 52/0216; H04B 7/088; H04B 7/0452; H04B 7/0413; H04B 7/0404; H04B 7/0417; H04B 17/318
  See application file for complete search history.

(56) References Cited

U.S. PATENT DOCUMENTS

| | | |
|---|---|---|
| 2011/0176519 A1 | 7/2011 | Vitthaladevuni |
| 2012/0213169 A1* | 8/2012 | Wang ............... H04L 5/0023 370/329 |
| 2014/0301383 A1* | 10/2014 | Sohn ............... H04B 7/0452 370/338 |
| 2015/0124689 A1* | 5/2015 | Merlin ............... H04L 1/009 370/312 |
| 2016/0134342 A1 | 5/2016 | Kneckt |
| 2016/0234831 A1* | 8/2016 | Tian ............... H04W 72/0413 |
| 2016/0285526 A1 | 9/2016 | Hedayat |
| 2017/0237532 A1 | 8/2017 | Li |
| 2017/0280424 A1 | 9/2017 | Gosh et al. |
| 2017/0294992 A1* | 10/2017 | Chu ............... H04L 5/0007 |

FOREIGN PATENT DOCUMENTS

| | | |
|---|---|---|
| CN | 107251472 A | 10/2017 |
| EP | 2 173 049 A1 | 4/2010 |

OTHER PUBLICATIONS

Extended European Search Report, European Patent Application No. 19153478.3, dated Jun. 7, 2019, eight pages.
Li, et al.; "DL MU MIMO Preference Indiation," May 8, 2018; https://mentor.ieee.org/802.11/dcn/.../11-18-0906-03 00ax-dl-mu-mimo-signaling.docx, doc.: IEEE 802.11-18/906r3; two pages.
Examination Report, European Patent Application No. 19153478.3, dated Apr. 20, 2020, five pages.
Office Action for Chinese Patent Application 201910143554.X, dated Apr. 26, 2021, 7 pages.

* cited by examiner

MULTI-USER MIMO PREFERENCE-INDICATION SIGNALING

CROSS-REFERENCE TO RELATED APPLICATION

This application claims the benefit of U.S. Provisional Application No. 62/638,334, entitled "Multi-User MIMO Preference-Indication Signaling," by Guoqing Li, et al., filed Mar. 5, 2018, the contents of which are hereby incorporated by reference.

FIELD

The described embodiments relate, generally, to wireless communications among electronic devices, and techniques for providing preference-indication information.

BACKGROUND

Many electronic devices communicate with each other using wireless local area networks (WLANs), such as those based on a communication protocol that is compatible with an IEEE 802.11 standard (which is sometimes referred to as 'Wi-Fi'). In order to increase throughput during communication, an access point using certain IEEE 802.11 standards can communicate with multiple recipient electronic devices (which are sometimes referred to as 'stations') using downlink (DL) multi-user (MU) multiple input multiple output (MIMO) communication.

However, DL MU MIMO communication can degrade the communication performance. For example, factors such as the mobility of the recipient electronic devices and/or varying channel conditions (such as due to changes in the environment) can degrade the communication performance when using DL MU MIMO communication.

In addition, there can be fairness issues with DL MU MIMO communication. Notably, legacy recipient electronic devices, which may not be compatible with MU MIMO communication, many have reduced channel access when an access point uses DL MU MIMO communication to communicate with multiple compatible recipient electronic devices.

SUMMARY

A first group of embodiments relates to an electronic device that receives preference-indication information. This electronic device may include a node that can be communicatively coupled to an antenna, and an interface circuit communicatively coupled to the node and that communicates with a recipient electronic device. During operation, the interface circuit receives the preference-indication information associated with the recipient electronic device, where the preference-indication information indicates whether the recipient electronic device prefers that the electronic device uses DL MU MIMO transmissions when communicating with the recipient electronic device. Then, the interface circuit provides a packet or frame intended for the recipient electronic device, where the packet or frame selectively specifies use of DL MU MIMO based at least in part in the preference-indication information.

Note that the electronic device may include an access point. Moreover, the electronic device may be compatible with IEEE 802.11ax.

Furthermore, the preference-indication information may be conveyed in a media access control (MAC) header. For example, the preference-indication information may be conveyed in a high throughput (HT) control field in the MAC header. In some embodiments, the preference-indication information is associated with a control identifier that is associated with a manufacturer of the recipient electronic device.

Alternatively, the preference-indication information may be conveyed in an information element in a management frame. In some embodiments, the management frame is associated with a manufacturer of the recipient electronic device.

Additionally, the preference-indication information may include: a motion indication, a received signal strength indication, a comparison of communication performance with and without using DL MU MIMO, and/or an indication of a changing wireless environment.

Moreover, the preference-indication information may indicate that the recipient electronic device is incapable of receiving DL MU MIMO transmissions.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Other embodiments provide a method for receiving performance-indication information. The method includes at least some of the aforementioned operations performed by the interface circuit in the electronic device.

A second group of embodiments relates to a recipient electronic device that provides preference-indication information. This electronic device may include a node that can be communicatively coupled to an antenna, and an interface circuit communicatively coupled to the node and that communicates with an electronic device. During operation, the interface circuit determines the preference-indication information associated with the recipient electronic device, where the preference-indication information indicates whether the recipient electronic device prefers that the electronic device use DL MU MIMO transmissions when communicating with the recipient electronic device. Then, the interface circuit provides the preference-indication information in a packet or a frame intended for the electronic device.

In some embodiments, the preference-indication information is selectively determined based at least on a trigger event. For example, the trigger event may include: a motion estimate determined by the recipient electronic device using at least a motion sensor; a received signal strength indication (RSSI) estimation based at least on one or more frames or packets received by the recipient electronic device that are associated with the electronic device; and/or a comparison of communication performance with and without use of DL MU MIMO.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the electronic device.

Other embodiments provide a method for providing performance-indication information. The method includes at least some of the aforementioned operations performed by the interface circuit in the recipient electronic device.

A third group of embodiments relates to a recipient electronic device that provides preference-indication information. This electronic device may include a node that can be communicatively coupled to an antenna, and an interface circuit communicatively coupled to the node and that communicates with an electronic device. During operation, the interface circuit determines a trigger event. Then, the interface circuit selectively computes the preference-indication information associated with the recipient electronic device based at least in part on the trigger event, where the preference-indication information indicates whether the recipient electronic device prefers that an electronic device use DL MU MIMO transmissions when communicating with the recipient electronic device. Moreover, the interface circuit provides the preference-indication information in a packet or a frame intended for the electronic device.

In some embodiments, the trigger event includes: a motion estimate determined by the recipient electronic device using at least a motion sensor; an RSSI estimation based at least on one or more frames or packets received by the recipient electronic device that are associated with the electronic device; and/or a comparison of communication performance with and without use of DL MU MIMO.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the electronic device.

Other embodiments provide a method for providing performance-indication information. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
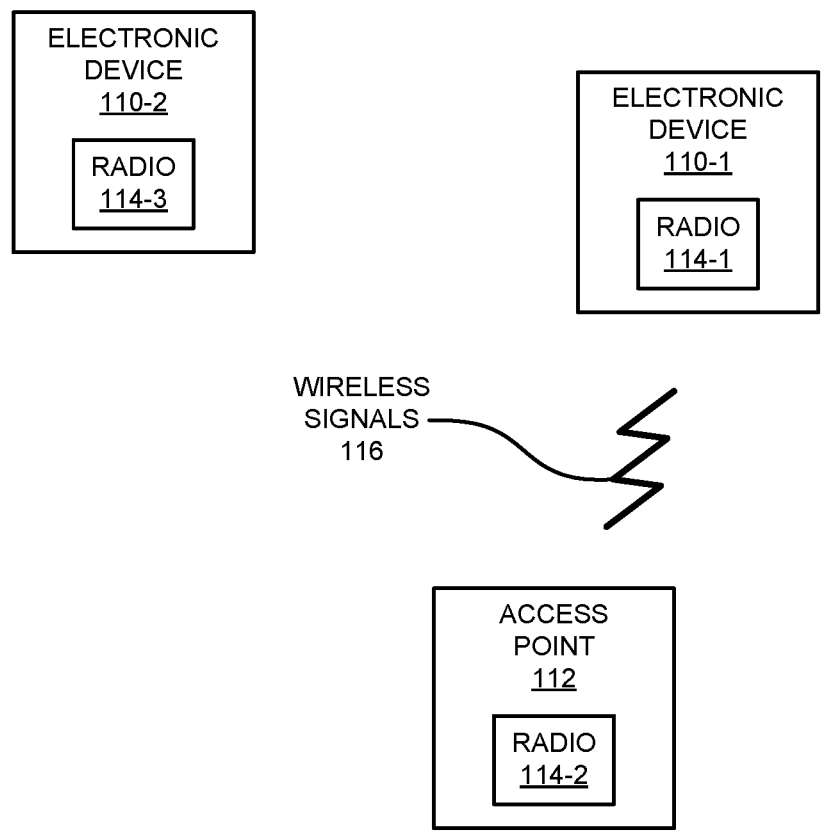
FIG. 1 is a block diagram illustrating an example of electronic devices communicating wirelessly.

An interface circuit in a recipient electronic device (such as a cellular telephone) may provide preference-indication information for an electronic device (such as an access point). Notably, the recipient electronic device may compute preference-indication information associated with the recipient electronic device, where the preference-indication information indicates whether the recipient electronic device prefers that the electronic device use downlink (DL) multi-user (MU) MIMO transmissions when communicating with the recipient electronic device. Then, the recipient electronic device may provide the preference-indication information in a packet or a frame associated with the electronic device. In some embodiments, the recipient electronic device determines a trigger event (such as measuring a motion indication), and the computing may be selectively performed based at least in part on the trigger event. Moreover, the preference-indication information may include additional information that was used by the recipient electronic device to compute the preference indication of the recipient electronic device.

By communicating the preference-indication information, this communication technique may facilitate improved communication performance between the electronic device and the recipient electronic device. For example, the communication technique may allow the recipient electronic device to selectively indicate or specify use of DL MU MIMO communication, such as when DL MU MIMO communication improves the communication performance. Moreover, by allowing the recipient electronic device to selectively indicate or specify use of DL MU MIMO, the communication technique may help ensure fairness during communication with the electronic device. Consequently, the communication technique may improve the user experience when using the electronic device or the recipient electronic device, and therefore may increase customer satisfaction and retention.

Note that the communication technique may be used during wireless communication between electronic devices in accordance with a communication protocol, such as a communication protocol that is compatible with an IEEE 802.11 standard (which is sometimes referred to as Wi-Fi). In some embodiments, the communication technique is used with IEEE 802.11ax, which is used as an illustrative example in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 6, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2.

As discussed previously, access point 112 may communicate with multiple electronic devices 110 using DL MU MIMO. However, in some embodiments, the use of DL MU MIMO communication may degrade the communication performance (such as the throughput) and/or may result in fairness issues.

In order to address this challenge, a given electronic device (such as electronic device 110-1) may provide, in a packet or a frame, preference-indication information to access point 112. For example, the preference-indication information may indicate whether electronic device 110-1 prefers that access point 112 use DL MU MIMO transmissions when communicating with electronic device 110-1. Moreover, the preference-indication information may include: a motion indication, a received signal strength indication, a comparison of communication performance with and without using DL MU MIMO, and/or an indication of a changing wireless environment. In some embodiments, the preference-indication information indicates that electronic device 110-1 is incapable of receiving DL MU MIMO transmissions.

In response to the preference-indication information, access point 112 may selectively use DL MU MIMO when communicating with electronic device 110-1. For example, access point 112 may selectively enable or disable the use of DL MU MIMO when communicating with electronic device 110-1. Moreover, access point 112 may provide a packet or frame to electronic device 110-1 that selectively specifies the use of DL MU MIMO based at least in part in the preference-indication information.

Note that electronic device 110-1 and access point 112 may be compatible with IEEE 802.11ax. However, in some embodiments, the communication technique may proprietary to a manufacturer of electronic device 110-1 and/or access point 112. For example, electronic devices provided by or authorized by the manufacturer may be able to use the communication technique.

In some embodiments, prior to providing the preference-indication information, electronic device 110-1 determines the preference-indication information. In some embodiments, the preference-indication information is selectively determined based at least on a trigger event. For example, the trigger event may include: a motion estimate determined by electronic device 110-1 using at least a motion sensor; an RSSI estimation based at least on one or more frames or packets received by electronic device 110-1 that are associated with access point 112; and/or a comparison of communication performance with and without use of DL MU MIMO.

In these ways, the communication technique may allow electronic devices 110 to communicate their preferences about the use of DL MU MIMO to access point 112, and for access point 112 to accordingly and selectively communicate with one or more of electronic devices 110 using DL MU MIMO. Thus, electronic devices 110 may indicate or specify the use of DL MU MIMO when it is advantageous, such as when the use of DL MU MIMO will improve or increase the communication performance. These capabilities may improve the user experience when using electronic devices 110 and/or access point 112.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (e.g., that do not use multi-user trigger-based channel access). In some embodiments, at least a subset of electronic devices 110 and/or access point 112 use MU transmission (such as orthogonal frequency division multiple access or OFDMA). For example, radio 114-2 may provide a trigger frame for the subset of recipient electronic devices. Moreover, in response to receiving the trigger frame, radio 114-1 may provide a group acknowledgment to radio 114-2. For example, radio 114-1 may provide the acknowledgment during an assigned time slot and/or in an assigned channel in the group acknowledgment. However, in some embodiments the one or more of electronic devices 110 may individually provide acknowledgments to radio 114-2. Thus, radio 114-1 (and, more generally, radios 114 in the one or more electronic devices 110) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
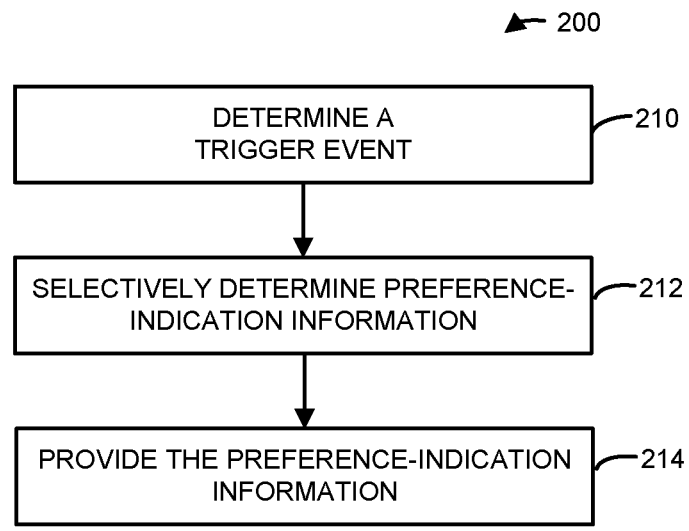
FIG. 2 is a flow diagram illustrating an example of a method for providing preference-indication information using one of the electronic devices in FIG. 1.

FIG. 2 presents a flow diagram illustrating an example method 200 for providing preference-indication information. This method may be performed by a recipient electronic device, such one or electronic devices 110 in FIG. 1. During operation, the recipient electronic device may selectively determine the preference-indication information (operation 212) associated with the recipient electronic device, where the preference-indication information indicates whether the recipient electronic device prefers that the electronic device use DL MU MIMO transmissions when communicating with the recipient electronic device.

Note that the electronic device may include an access point. Moreover, the electronic device may be compatible with IEEE 802.11ax.

Furthermore, the preference-indication information may be conveyed in a MAC header. For example, the preference-indication information may be conveyed in a HT control field in the MAC header. In some embodiments, the preference-indication information is associated with a control identifier that is associated with a manufacturer of the recipient electronic device.

Alternatively, the preference-indication information may be conveyed in an information element in a management frame. In some embodiments, the management frame is associated with a manufacturer of the recipient electronic device.

Additionally, the preference-indication information may include: a motion indication, a received signal strength indication, a comparison of communication performance with and without using DL MU MIMO, and/or an indication of a changing wireless environment.

Moreover, the preference-indication information may indicate that the recipient electronic device is incapable of receiving DL MU MIMO transmissions.

Then, the recipient electronic device may provide the preference-indication information (operation 214) in a packet or a frame intended for the electronic device.

In some embodiments, the preference-indication information is selectively determined based at least on a trigger event. For example, the recipient electronic device may optionally determine the trigger event (operation 210). Note that the trigger event may include: a motion estimate determined by the recipient electronic device using at least a motion sensor (e.g., in the recipient electronic device); an RSSI estimation based at least on one or more frames or packets received by the recipient electronic device that are associated with the electronic device; and/or a comparison of communication performance with and without use of DL MU MIMO.

Figure 3:
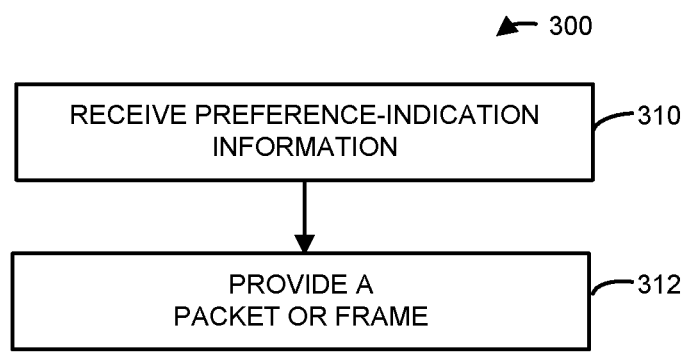
FIG. 3 is a flow diagram illustrating an example of a method for receiving preference-indication information using one of the electronic devices in FIG. 1.

FIG. 3 presents a flow diagram illustrating an example method 300 for receiving preference-indication information. This method may be performed by an electronic device, such as access point 112 in FIG. 1. During operation, the electronic device may receive the preference-indication information (operation 310) associated with the recipient electronic device, where the preference-indication information indicates whether the recipient electronic device prefers that the electronic device uses DL MU MIMO transmissions when communicating with the recipient electronic device. Then, the electronic device may provide a packet or frame (operation 312) intended for the recipient electronic device, where the packet or frame selectively specifies use of DL MU MIMO based at least in part in the preference-indication information.

In some embodiments of methods 200 (FIG. 2) and/or 300, there may be additional or fewer operations. Moreover, the order of the operations may be changed, and/or two or more operations may be combined into a single operation or performed at least partially in parallel.

In some embodiments, at least some of the operations in methods 200 (FIG. 2) and/or 300 are, at least in part, performed by an interface circuit in the electronic device or the recipient electronic device. For example, at least some of the operations may be performed by firmware executed by an interface circuit, such as firmware associated with a MAC layer, as well as one or more circuits in a physical layer in the interface circuit.

Figure 4:
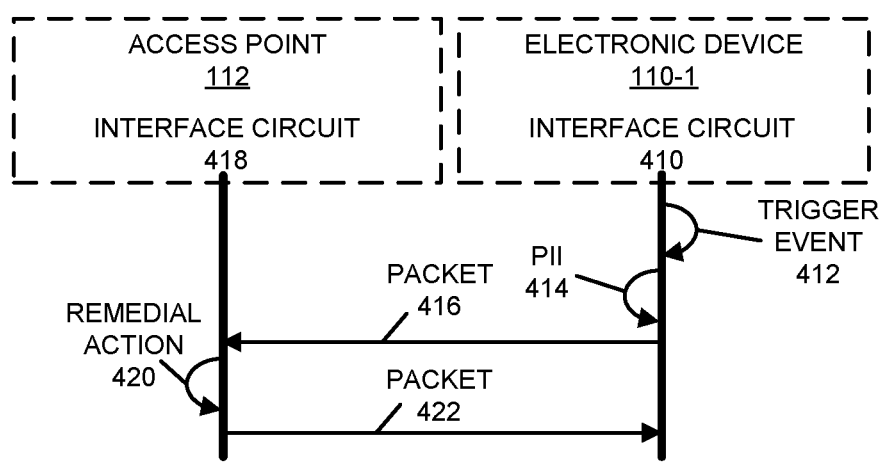
FIG. 4 is a flow diagram illustrating an example of communication between electronic devices, such as the electronic devices of FIG. 1.

The communication technique is further illustrated in FIG. 4, which presents a flow diagram illustrating an example of communication between electronic device 110-1 and access point 112. After associating with access point 112, interface circuit 410 in electronic device 110-1 may determine a trigger event 412. Based at least in part on the trigger event 412, interface circuit 410 may selectively determine preference-indication information (PII) 414. Then, interface circuit 410 may provide a packet 416 or frame to access point 112 with information that specifies or indicates the preference-indication information 414.

After receiving packet 416, interface circuit 418 in access point 112 may perform a remedial action 420 based at least in part on the preference-indication information 414, such as determining whether to selectively enable or disable the use of DL MU MIMO. Moreover, interface circuit 418 may provide a packet 422 or frame to electronic device 110-1 with information that specifies or indicates whether DL MU MIMO will be used during communication between access point 112 and electronic device 110-1.

While communication between the components in FIG. 4 is illustrated with unilateral or bilateral communication (e.g., lines having a single arrow or dual arrows), in general a given communication operation may be unilateral or bilateral.

Moreover, while FIG. 4 illustrates operations being performed by interface circuits 410 and 418, at least some of these operations in either electronic device 110-1 or access point 112 may be performed by a process (which is separate from interface circuit 410 or 418) in electronic device 110-1 or access point 112.

As described previously, some IEEE 802.11 standards include DL MU MIMO as an optional feature during communication between an access point and an associated recipient electronic device. For example, an addendum or update to IEEE 802.11ac, which is sometimes referred to as 802.11ac Wave 2, uses optional DL MU MIMO to increase the theoretical data rate up to 6.93 Gbps. Notably, DL MU MIMO allows an access point that is compatible with IEEE 802.11ac to concurrently send data to multiple recipient electronic devices that are separated from each other in the spatial domain using MIMO/beamforming techniques. Note that DL MU MIMO typically relies on supporting features, such as null data packet (NDP) sounding and beamforming reports to collect channel-state information, which is used by the access point to determine one or more antenna patterns and communication parameters.

In principle, DL MU MIMO can significantly increase network and electronic-device throughput. Notably, the theoretical network throughput can increase almost linearly with the number of antennas used by an access point.

Recently, IEEE 802.11ax has made DL MU MIMO mandatory for recipient electronic devices, and conditionally mandatary for access points that support less or equal to four antennas or antenna elements. Consequently, recipient electronic devices that are compatible with IEEE 802.11ax will need to support reception of DL MU MIMO transmissions from any IEEE 802.11ax-compatible access point that implements this feature.

However, sometimes the performance of DL MU MIMO is well below the theoretical throughput capabilities. Indeed, in some circumstances or wireless environments, the communication performance of DL MU MIMO is degraded relative to other communication techniques. For example, when a recipient electronic device in a WLAN is static, the communication performance may be improved by an access point using DL MU MIMO, but when the recipient electronic device is mobile the communication performance can be poorer when the access point uses DL MU MIMO than when DL MU MIMO is not used (such as, e.g., relative to a single-user or SU communication technique). This performance degradation can be increased when there are multiple recipient electronic devices in a WLAN.

Moreover, changes in channel conditions in a wireless environment (such as when a mechanical fan is turned on) can cause the communication performance of DL MU MIMO to degrade significantly (e.g., the throughput may be reduced by up to 33%). Note that the degradation in the communication performance when there is motion and/or a change in the channel conditions may be based at least in part on how often an access point polls or samples the recipient electronic device(s) for channel information (and, thus, the accuracy or freshness of the steering matrix computations by the access point).

Furthermore, fairness may be an in issue depending on the scheduling technique used by an access point. This may also adversely impact the communication performance of legacy recipient electronic devices when an access point uses DL MU MIMO.

In order to address these problems, in the disclosed communication technique a recipient electronic device may communication preference-indication information to an access point about whether the recipient electronic device prefers or recommends the use of DL MU MIMO during communication between the access point and the recipient electronic device. The access point may use the preference-indication information when determining whether to use DL MU MIMO to communicate with the recipient electronic device.

Notably, because IEEE 802.11 ax has mandated support of DL MU MIMO, it may be useful to help an IEEE 802.11ax-compatible access point to deliver good communication performance when using DL MU MIMO. However, the DL MU MIMO communication technique may be sensitive to factors, such as: mobility of a recipient electronic device, a changing wireless environment, and/or the distance between an access point and a recipient electronic device.

In order to assist an access point in deciding whether to use DL MU MIMO when communicating with a recipient electronic device, the recipient electronic device may use preference-indication signaling to indicate its preference as to whether its associated access point should use DL MU MIMO when communicating with the recipient electronic device. In some embodiments, the preference indication indicates that the recipient electronic device is incapable of receiving DL MU MIMO transmissions. Thus, in some embodiments the preference indication is a 'strong' preference, which may be equivalent to capability indication. In some embodiments, the preference-indication signaling may be selective. For example, the preference-indication signaling may be triggered based at least on one or more of: motion estimation by the recipient electronic device, RSSI measurements or estimation, and/or a modulation coding scheme (MCS) comparison between DL MU MIMO and another communication technique (such as DL SU transmission).

There may be several options as to how a recipient electronic device communicates the preference indication to an associated access point. One approach is to convey information in a MAC header.

Figure 5:
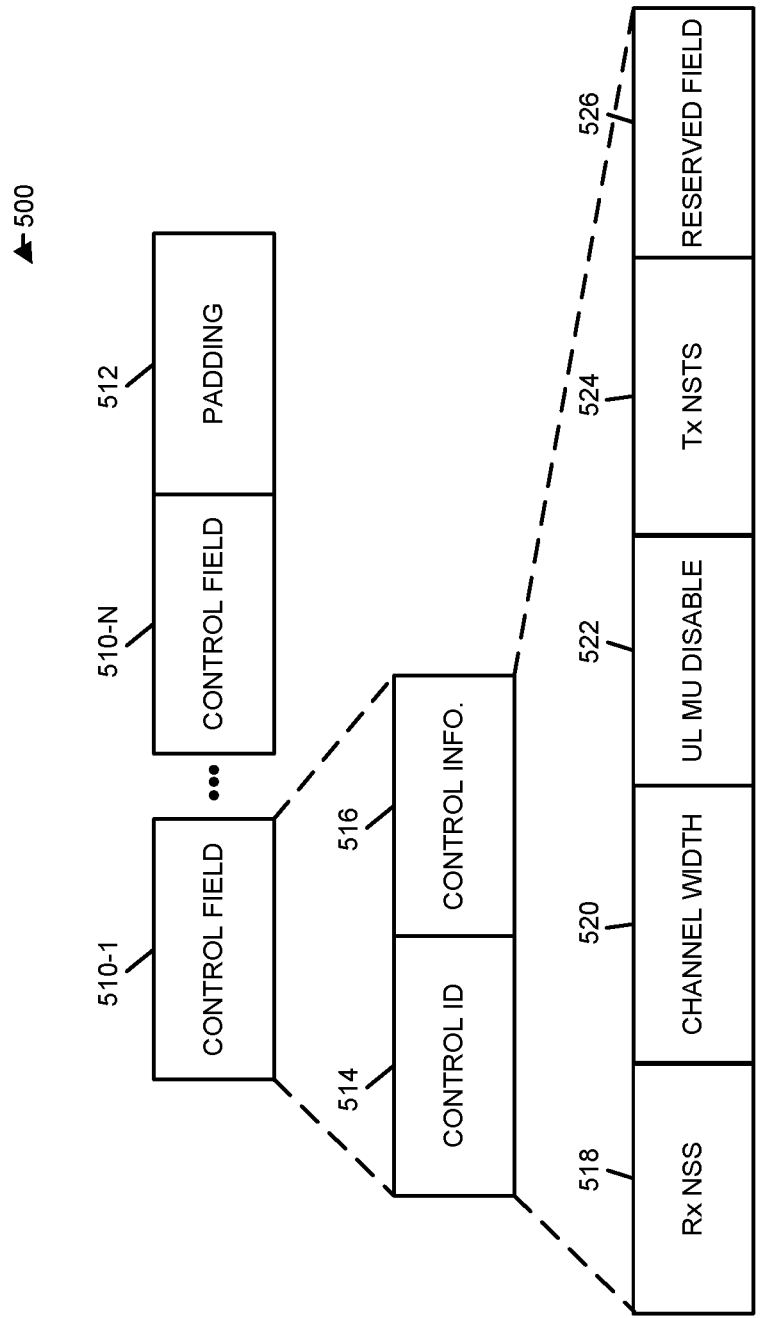
FIG. 5 is a drawing illustrating an example of a media access control (MAC) header during communication between electronic devices, such as the electronic devices of FIG. 1.

FIG. 5 presents a drawing illustrating an example of a MAC header 500 during communication between electronic device 110-1 and access point 112. Notably, MAC header 500 may include multiple HT control fields 510 (each with, e.g., four or more bits) and optional padding 512 (with, e.g., zero or more bits). HT control field 510-1 may include a control identifier (ID) 514 (with, e.g., four bits) and control information 516 (with a variable number of bits). When the control identifier equals, e.g., '1', the control information 516 may provide an operating mode (OM) control type of the A-control field. For example, the control information 516 may include: a number of receive spatial streams (Rx NSS) 518 (which may include, e.g., three bits), a channel width 520 (which may include, e.g., two bits), information that specifies whether uplink (UL) MU is disabled 522 (which may include, e.g., one bit), a number of transmit space time streams (Tx NSTS) 524 (which may include, e.g., three bits), and a reserved field (RF) 526 (which may include, e.g., three bits). One or more of the reserved bits in the reserved field 526 may be used to indicate whether the recipient electronic device is willing to be included in a DL MU MIMO transmission from an access point. For example, when the control identifier 514 is '1', one or more of the reserved bits may be used to convey the preference indication. Note that in some embodiments of MAC header 500 the order of items can vary and additional and/or different items can be included.

Alternatively, a new value of the control identifier 514 may be defined in the A-control field in HT control field 510. For example, one of control-identifier values 7 through 15 may be used to indicate that MAC header 500 conveys or carries the SU/MU preference indication. This approach may provide more bits in MAC header 500 that can be used for the preference-indication signaling.

In some embodiments, a new information element (IE) or new a vendor or manufacturer-specific information element may be defined and may be carried or conveyed in a vendor or manufacturer-specific action or management frame. This proprietary approach may be used to convey the preference-indication information.

Furthermore, the contents of the DL MU MIMO signaling from the recipient electronic device using one of the preceding options may include one or more of: a DL MU MIMO preference (such as whether the recipient electronic device is willing to be included in DL MU MIMO transmissions from an access point); a high-mobility indication (such as whether the recipient electronic device considers that it has high mobility and is not suited for DL MU MIMO transmissions from the access point); a low-RSSI indication (such as whether the recipient electronic device considers itself to be in a low-RSSI region, e.g., below 75 dBm, and that it should not be included in DL MU MIMO transmissions from the access point); an MCS comparison with one or more other communication techniques (such as whether the recipient electronic device considers that the MCS is too low and that it is not suited for DL MU MIMO transmissions from the access point); and/or an environment-changing indication (such as whether the recipient electronic device considers that the environment is changing and, thus, that it is not suited for DL MU MIMO transmissions from the access point).

For example, a recipient electronic device may measure or determine its speed or velocity (such as using triangulation or trilateration in a WLAN, a cellular-telephone network, using GPS, using an accelerometer in the recipient electronic device, etc.). Then, based at least in part on a coherence time in the WLAN or a fixed threshold (such as, e.g., 5 m/s), the recipient electronic device may determine whether it has a high-mobility indication, which is then provided to the access point.

Thus, in some embodiments, a recipient electronic device may provide the preference indication and additional information that explains the preference indication of the recipient electronic device. This information may be used by the access point to determine whether or not to use DL MU MIMO with the recipient electronic device. Consequently, in some embodiments, the intelligence or decision-making as to whether or not to use DL MU MIMO with the recipient electronic device occurs in the recipient electronic device, the access point or both.

In summary, preference-indication signaling may allow an IEEE 802.11ax-compatible recipient electronic device to report its preference of using DL MU MIMO with its associated access point. In some embodiments, the preference indication indicates that the recipient electronic device is incapable of receiving DL MU MIMO transmissions. There may be several options for such preference-indication signaling. Notably, the recipient electronic device may use reserved bits of the OM control type of the A-control field, which is carried in the HT control field in a MAC header.

Alternatively, a new control identifier may be defined to convey the preference-indication information or another preference-indication signaling technique may be used. Once again, the preference-indication signaling may be carried in the HT control field in a MAC header. In some embodiments, a new information element is defined and/or a new vendor or manufacturer-specific information element is defined. The new information element and/or the vendor or manufacturer-specific information element may be carried in regular frames, such as a vendor-specific action or other management frames.

In some embodiments, the preference-indication information includes one or more of: an overall preference as to whether the recipient electronic device prefers to use DL MU MIMO (such as yes or no); an overall capability indication as to whether the recipient electronic device is capable of receiving DL MU MIMO transmissions (such as 'yes' or 'no'); a mobility indication; a low-RSSI indication; a low-MCS indication; and/or an environment-changing indication.

Note that the preference-indication signaling may be triggered by one or more techniques, such as: motion estimation (e.g., using one or more motion sensors on the recipient electronic device); RSSI estimation based at least in part on received packets from an access point; and/or an MCS comparison between, e.g., SU and MU MIMO transmissions. Thus, the feedback signaling may be selective. Similarly, an IEEE-802.11ax-compatible access point can use the DL MU MIMO preference indication from the recipient electronic device to decide whether it transmits a DL MU MIMO physical layer convergence procedure (PLCP) protocol data unit (PPDU) to the recipient electronic device, e.g., the use of DL MU MIMO by the access point may be selective.

We now describe embodiments of an electronic device. FIG. 6 presents a block diagram of an electronic device 600 (which may be a cellular telephone, an access point, another electronic device, etc.) in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, graphics processing units (GPUs), programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), a read-only memory (ROM), flash memory, and/or other types of memory. In some embodiments, instructions for processing subsystem 610 in memory subsystem 612 include: program instructions or sets of instructions (such as program instructions 622 or operating system 624), which may be executed by processing subsystem 610. For example, a ROM can store programs, utilities or processes to be executed in a non-volatile manner, and DRAM can provide volatile data storage, and may store instructions related to the operation of electronic device 600. Note that the one or more computer programs may constitute a computer-program mechanism, a computer-readable storage medium or software. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610. In some embodiments, the one or more computer programs are distributed over a network-coupled computer system so that the one or more computer programs are stored and executed in a distributed manner.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Figure 6:
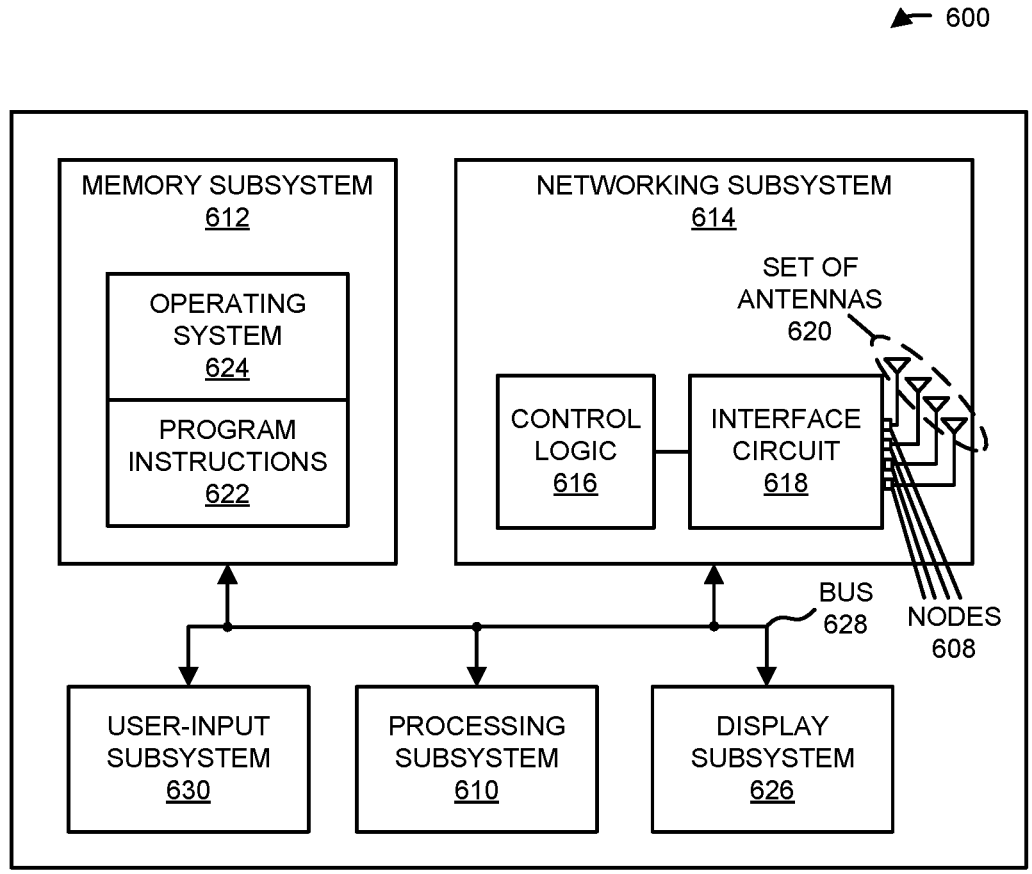
FIG. 6 is a block diagram illustrating an example of one of the electronic devices of FIG. 1.

Networking subsystem 614 includes one or more devices configured to couple to and communicate on a wired and/or wireless network (e.g., to perform network operations), including: control logic 616, an interface circuit 618 and a set of antennas 620 (or antenna elements) in an adaptive array that can be selectively turned on and/or off by control logic 616 to create a variety of optional antenna patterns or 'beam patterns.' (While FIG. 6 includes set of antennas 620, in some embodiments electronic device 600 includes one or more nodes, such as nodes 608, e.g., a pad, which can be coupled to set of antennas 620. Thus, electronic device 600 may or may not include set of antennas 620.) For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 614 includes one or more radios, such as a wake-up radio that is used to receive wake-up frames while a main radio is in a lower-power mode and to selectively transition the main radio from the lower-power mode to a higher-power mode based at least in part on information included in or specified by a wake-up frame, and a main radio that is used to transmit and/or to receive frames or packets during the higher-power mode. The wake-up radio and the main radio may be implemented separately (such as using discrete components or separate integrated circuits) or in a common integrated circuit.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or frame frames and/or scanning for advertising frames transmitted by other electronic devices.

Within electronic device 600, processing subsystem 610, memory subsystem 612, and networking subsystem 614 are coupled together using bus 628 that facilitates data transfer between these components. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Display subsystem 626 may be controlled by processing subsystem 610 to display information to a user (e.g., information relating to incoming, outgoing, or an active communication session).

Electronic device 600 can also include a user-input subsystem 630 that allows a user of the electronic device 600 to interact with electronic device 600. For example, user-input subsystem 630 can take a variety of forms, such as: a button, keypad, dial, touch screen, audio input interface, visual/image capture input interface, input in the form of sensor data, etc.

Electronic device 600 can be (or can be included in) any electronic device with at least one network interface. For example, electronic device 600 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. This integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 622, operating system 624 (such as a driver for interface circuit 618) or in firmware in interface circuit 618. Alternatively or additionally, at least some of the operations in the communication technique may be implemented in a physical layer, such as hardware in interface circuit 618. In some embodiments, the communication technique is implemented, at least in part, in a MAC layer and/or in a physical layer in interface circuit 618.

While examples of numerical values are provided in the preceding discussion, in other embodiments different numerical values are used. Consequently, the numerical values provided are not intended to be limiting.

While the preceding embodiments illustrated the use of a packets or frames that are communicated using Wi-Fi, in other embodiments of the communication technique Bluetooth Low Energy is used to communicate one or more of these frames or packets. Furthermore, the packets or frames may be communicated in the same or a different band of frequencies that the band(s) of frequencies used by another radio in electronic device 600. For example, the wake-up frame and/or the acknowledgment may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a node configured to communicatively couple to an antenna; and
   an interface circuit, communicatively coupled to the node, configured to communicate with a recipient electronic device, wherein the interface circuit is configured to:
   receive, from the node, preference-indication information associated with the recipient electronic device, wherein the preference-indication information indicates whether the recipient electronic device prefers that the electronic device uses downlink (DL) multi-user (MU) multiple input multiple output (MIMO) transmissions when communicating with the recipient electronic device,
   wherein, when the preference-indication information indicates that the recipient electronic device prefers that the electronic device uses DL MU MIMO transmissions, the preference-indication information comprises a variable preference that the electronic device uses downlink DL MU MIMO transmissions when communicating with the recipient electronic device,
   wherein a change of the variable preference is based at least in part on motion of the recipient electronic device measured using a motion sensor, and
   wherein the preference-indication information is conveyed by one or more reserved bits in a media access control (MAC) header as indicated by a control identifier in the MAC header; and
   provide, to the node, a packet or frame intended for the recipient electronic device, wherein the packet or frame selectively specifies use of DL MU MIMO based at least in part in the preference-indication information.

2. The electronic device of claim 1, wherein the electronic device is compatible with an IEEE 802.11ax protocol.

3. The electronic device of claim 1, wherein the preference-indication information is conveyed in a A-control field in a high throughput (HT) control field in the MAC header.

4. The electronic device of claim 3, wherein the control identifier is associated with a manufacturer of the recipient electronic device.

5. The electronic device of claim 1, wherein the preference-indication information is conveyed in an information element in a management frame.

6. The electronic device of claim 5, wherein the management frame is associated with a manufacturer of the recipient electronic device.

7. The electronic device of claim 1, wherein the preference-indication information comprises at least one of: a motion indication, a received signal strength indication, a comparison of communication performance with and without using DL MU MIMO, or an indication of a changing wireless environment.

8. The electronic device of claim 1, wherein the preference-indication information indicates that the recipient electronic device is incapable of receiving DL MU MIMO transmissions.

9. A recipient electronic device, comprising:
   a node configured to communicatively couple to an antenna; and
   an interface circuit, communicatively coupled to the node, configured to communicate with an electronic device, wherein the interface circuit is configured to:
   determine preference-indication information associated with the recipient electronic device, wherein the preference-indication information indicates whether the recipient electronic device prefers that the electronic device use downlink (DL) multi-user (MU) multiple input multiple output (MIMO) MIMO transmissions when communicating with the recipient electronic device,
   wherein, when the preference-indication information indicates that the recipient electronic device prefers that the electronic device uses DL MU MIMO transmissions, the preference-indication information comprises a variable preference that the electronic device uses downlink DL MU MIMO transmissions when communicating with the recipient electronic device,
   wherein a change of the variable preference is based at least in part on motion of the recipient electronic device measured using a motion sensor, and
   wherein the preference-indication information is conveyed by one or more reserved bits in a media access control (MAC) header as indicated by a control identifier in the MAC header; and
   provide, to the node, the preference-indication information in a packet or a frame intended for the electronic device.

10. The recipient electronic device of claim 9, wherein the preference-indication information is conveyed in a A-control field in a high throughput (HT) control field in the MAC header.

11. The recipient electronic device of claim 10, wherein the control identifier is associated with a manufacturer of the recipient electronic device.

12. The recipient electronic device of claim 9, wherein the preference-indication information is conveyed in an information element in a management frame.

13. The recipient electronic device of claim 12, wherein the management frame is associated with a manufacturer of the recipient electronic device.

14. The recipient electronic device of claim 9, wherein the preference-indication information comprises at least one of: a motion indication, a received signal strength indication, a comparison of communication performance with and without using DL MU MIMO, and an indication of a changing wireless environment.

15. The recipient electronic device of claim 9, wherein the preference-indication information is selectively determined based at least on a trigger event; and
 wherein the trigger event comprises at least one of: a motion estimate determined by the recipient electronic device using at least the motion sensor; a received signal strength indication (RSSI) estimation based at least on one or more frames or packets received by the recipient electronic device that are associated with the electronic device; or a comparison of communication performance with and without use of DL MU MIMO.

16. The recipient electronic device of claim 9, wherein the preference-indication information indicates that the recipient electronic device is incapable of receiving DL MU MIMO transmissions.

17. A method for providing preference-indication information, comprising:
 by a recipient electronic device:
  determining a trigger event;
  selectively computing the preference-indication information associated with the recipient electronic device based at least in part on the trigger event,
  wherein the preference-indication information indicates whether the recipient electronic device prefers that an electronic device use downlink (DL) multi-user (MU) multiple input multiple output (MIMO) MIMO transmissions when communicating with the recipient electronic device,
  wherein, when the preference-indication information indicates that the recipient electronic device prefers that the electronic device uses DL MU MIMO transmissions, the preference-indication information comprises a variable preference that the electronic device uses downlink DL MU MIMO transmissions when communicating with the recipient electronic device,
  wherein a change of the variable preference is based at least in part on motion of the recipient electronic device measured using a motion sensor, and
  wherein the preference-indication information is conveyed by one or more reserved bits in a media access control (MAC) header as indicated by a control identifier in the MAC header; and
  providing the preference-indication information in a packet or a frame intended for the electronic device.

18. The method of claim 17, wherein the trigger event comprises at least one of: a motion estimate determined by the recipient electronic device using at least the motion sensor; a received signal strength indication (RSSI) estimation based at least on one or more frames or packets received by the recipient electronic device that are associated with the electronic device; or a comparison of communication performance with and without use of DL MU MIMO.

19. The method of claim 17, wherein the preference-indication information is conveyed in a A-control field in a high throughput (HT) control field in the MAC header.

20. The method of claim 17, wherein the preference-indication information is conveyed in an information element in a management frame.

* * * * *